No. 738,958. PATENTED SEPT. 15, 1903.
E. THOMPSON.
GAGE AND ALARM FOR STEAM BOILERS.
APPLICATION FILED DEC. 22, 1902.

NO MODEL.

Witnesses
William James Cox
Frank William Pattison

Inventor
Ernest Thompson
By his Attorney
Geo. H. Rayner

No. 738,958. Patented September 15, 1903.

UNITED STATES PATENT OFFICE.

ERNEST THOMPSON, OF HOLLINWOOD, NEAR OLDHAM, ENGLAND.

GAGE AND ALARM FOR STEAM-BOILERS.

SPECIFICATION forming part of Letters Patent No. 738,958, dated September 15, 1903.

Application filed December 22, 1902. Serial No. 136,256. (No model.)

*To all whom it may concern:*

Be it known that I, ERNEST THOMPSON, a subject of the King of Great Britain and Ireland, and a resident of 40 Hardman street, Hollinwood, near Oldham, in the county of Lancashire, England, have invented an Improved Gage and Alarm for Steam-Boilers, of which the following is a specification.

This invention relates to a gage and alarm for use with steam-boilers, and is intended to indicate by electrical means when the water in the boiler falls or rises below or above the proper levels.

The gage is of the ordinary steam-gage pattern, marked in inches and parts of an inch, and upon the dial is placed an electrical contact in such a position that when the finger or pointer reaches either end the water is at maximum or minimum level. Electrical connections are made to a bell or other suitable indicator, which may be in any position, so that the person in charge is at once warned that something is wrong. The hand or pointer is operated by a sprocket-wheel and chain carrying a float and counterpoise, the float rising or falling with the water-level.

In order that this invention may be more readily understood, reference is had to the accompanying sheet of drawings, in which—

Figure 1:
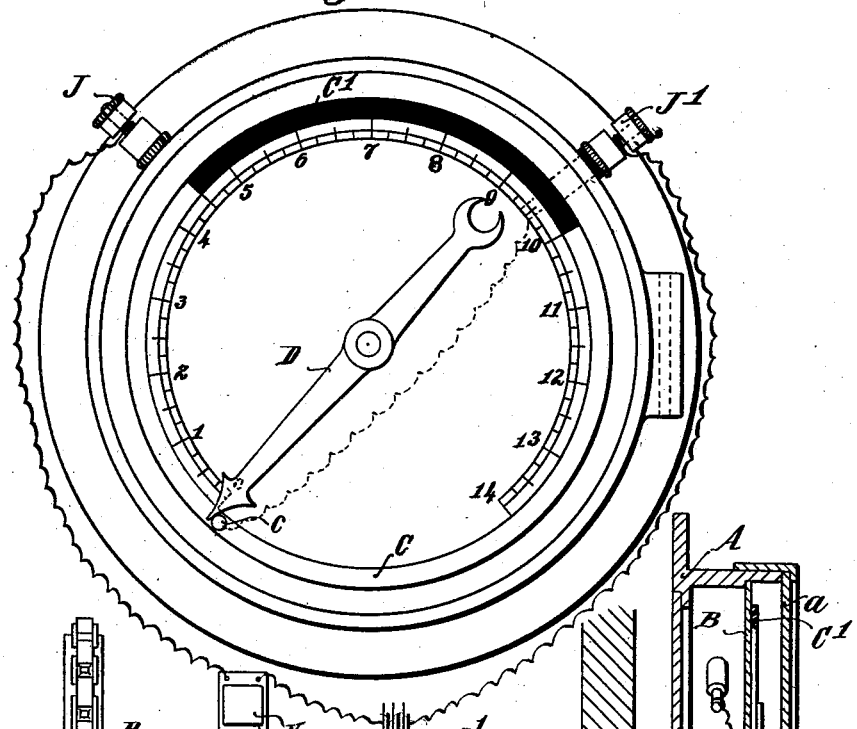
Figure 2:
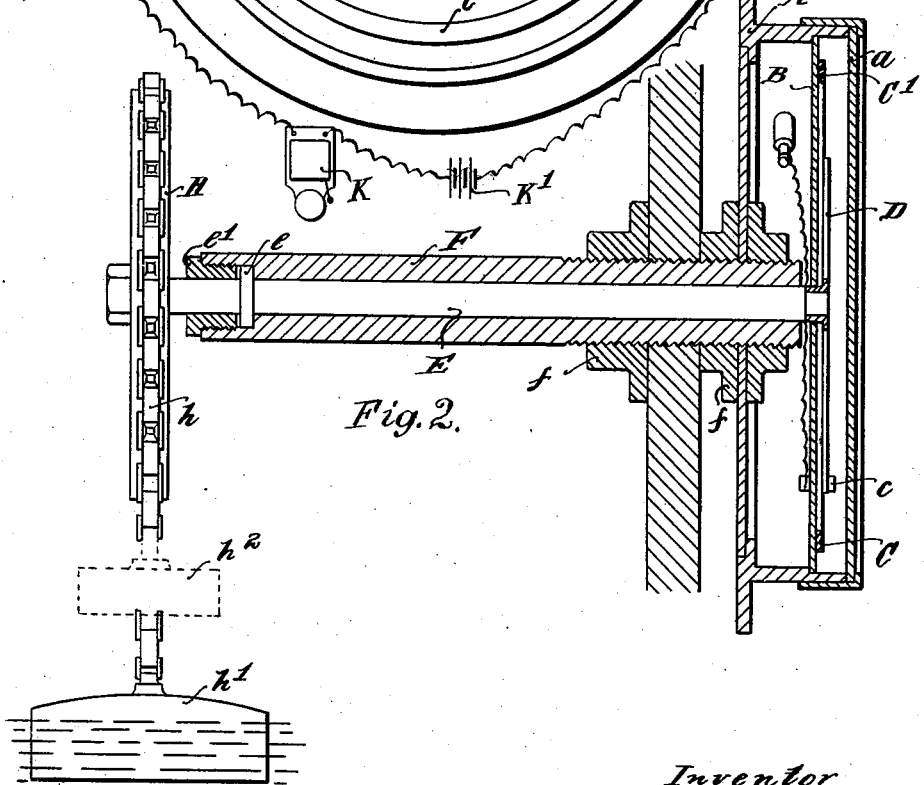

Figure 1 is a front view of my improved indicator and alarm, and Fig. 2 is a section showing both outside and inside parts.

A is the casing of the gage, having the ordinary cover $a$, through which the indicator is seen.

B is the dial-plate, and upon the face of this is fixed a ring consisting of the metal part C and a vulcanite or other non-conducting part C', the dial being graduated in inches, as shown. In the apparatus illustrated the metal contact-ring extends throughout the greater part of the circle, the vulcanite portion reaching only from four and one-half inches to ten inches.

The pointer or hand D is carried upon the spindle E, which fits closely in the metal sleeve F, secured by the screwed nuts $f$ in the face of the boiler-casing G, the sleeve and spindle projecting some distance within the boiler. The spindle E is formed with the collar $e$, and the nut $e'$ presses it against its seating in the sleeve F, forming a steam-tight joint.

On the inner end of the spindle E is the sprocket-wheel H, and over this passes the chain $h$, carrying the float $h'$, and having at its other end a counterpoise $h^2$, which keeps the chain taut, this being shown in dotted lines in Fig. 2.

The gage-casing is provided with the terminals J and J', the terminal J being in electrical connection with the pointer D through the casing and spindle and the terminal J' being insulated from the casing and connected to the contact-ring C through the screw-pin $c$, which passes through the dial-plate B and also acts as a stop for the pointer D when at its extreme position.

The terminals J and J' are electrically connected to any suitable form of alarm, such as the ball K, and to the battery K', (shown diagrammatically in Fig. 1,) and it will be seen that when the pointer, the end of which always bears upon the ring, falls below four and one-half inches or rises above ten inches, according to the arrangement shown in Fig. 1, an alarm is given indicating that the water has reached a dangerous level. The position of the pointer of course depends upon the level of the float $h'$ within the boiler, the sprocket-wheel H turning as the float rises or falls.

What I claim as my invention, and desire to secure by Letters Patent, is—

The improved gage and alarm for steam-boilers, having a dial-plate B within a casing, a circular contact C upon the dial, a long spindle E carrying the pointer, a sleeve F supporting the spindle E, the collar $e$ on the spindle bearing against a seating in the sleeve and forming a steam-tight joint, a sprocket-wheel H upon the inner end of the spindle, a chain $h$ having float $h'$ and counterpoise $h^2$ supported upon the sprocket-wheel and electrical connections from a battery and alarm to the pointer D and contact-piece C, substantially as herein described and shown.

In witness whereof I have hereunto set my hand in the presence of two witnesses.

ERNEST THOMPSON.

Witnesses:
 ARNOLD RILEY,
 PETER THOMPSON.